W. W. SIDES.
HYDRAULIC CLUTCH.
APPLICATION FILED OCT. 14, 1918.
1,406,292.
Patented Feb. 14, 1922.
2 SHEETS—SHEET 1.
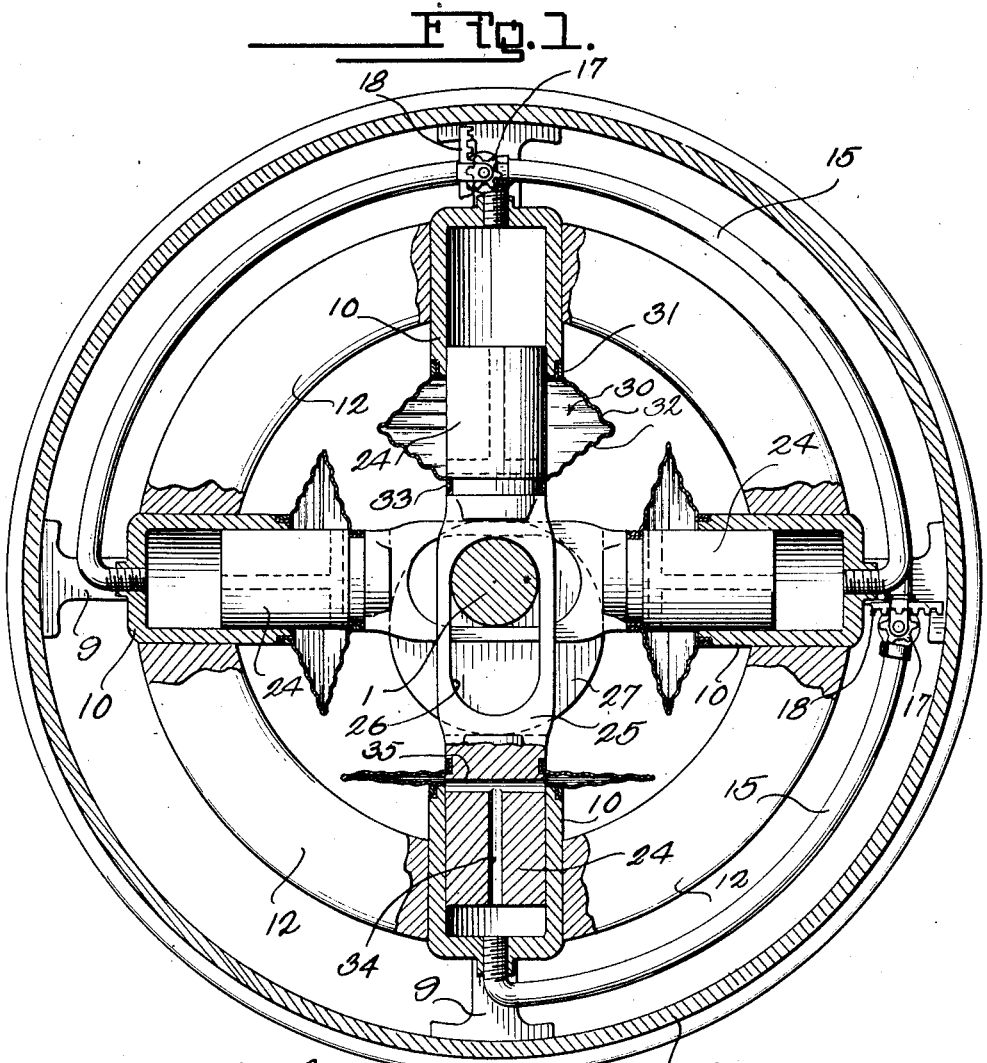
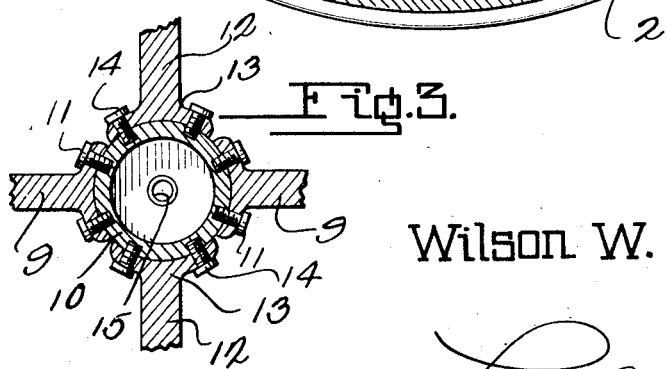
Wilson W. Sides
Inventor

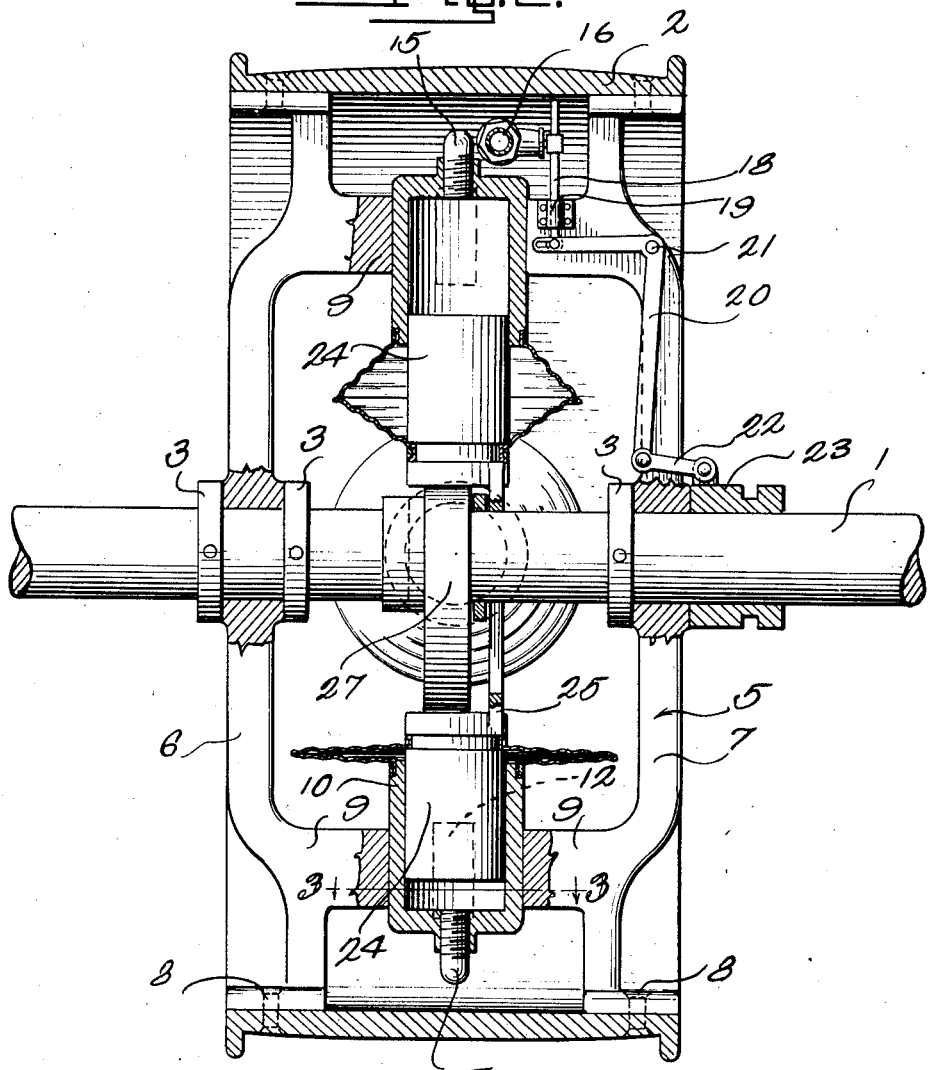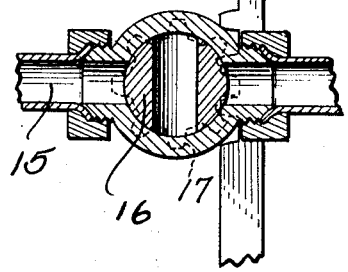

UNITED STATES PATENT OFFICE.

WILSON W. SIDES, OF KEARNEY, NEBRASKA, ASSIGNOR TO JOHN W. PATTERSON, OF KEARNEY, NEBRASKA.

HYDRAULIC CLUTCH.

1,406,292.   Specification of Letters Patent.   Patented Feb. 14, 1922.

Application filed October 14, 1918. Serial No. 258,043.

*To all whom it may concern:*

Be it known that I, WILSON W. SIDES, a citizen of the United States, residing at Kearney, in the county of Buffalo and State of Nebraska, have invented certain new and useful Improvements in a Hydraulic Clutch, of which the following is a specification.

This invention relates to a hydraulic clutch mechanism for controlling the rotation of a driven member, such as a pulley, by the rotation of a drive member, and an object of the invention is to provide a hydraulic clutch mechanism in which the loss of the liquid due to wear on the parts of the clutch is practically eliminated, and in which valves are interposed for controlling the volume of liquid displaced during the rotation of the clutch, thereby permitting the regulation of the speed of rotation of the driven member with respect to the speed of rotation of the driving member allowing the former to be driven at a speed corresponding to or at varying speeds less than that of the driving member.

In similar articles, such as dash pots, or hydraulic clutches now commonly used, stuffing boxes are used to prevent the escape of the liquid from about the piston at the inner end of the cylinder and it is well known that these stuffing boxes become worn during the excessive reciprocatory movement of the piston, allowing leakage of the liquid from the clutch mechanism and consequently decreasing the efficiency of the clutch mechanism; and it is an object of this invention to embody, in a hydraulic clutch mechanism diaphragm structures which are connected to the cylinders and the piston at the inner ends of the cylinders and expand and collapse during the reciprocatory movement of the piston which diaphragm structures have communication with the liquid retaining portion of the cylinder through ducts or ways formed in the piston, permitting the passage of a limited amount of the oil or liquid used in the hydraulic clutch into the diaphragm structures when the same are expanded and allowing the expulsion of the liquid from the diaphragm members upon the contraction thereof. The oil, when oil is used as a hydraulic liquid, which is ordinarily the case, will lubricate the surface of the pistons upon their out strokes coacting in the efficient lubrication of the clutch structure and the reduction of the wear of the movable or engaging parts thereof.

Other objects of the invention will appear in the following detailed description taken in connection with the accompanying drawings, forming a part of this specification, and in which drawings:

Figure 1 is a section through the clutch mechanism showing the arrangement of cylinders and pistons and their manner of connection.

Figure 2 is a section through the clutch mechanism, taken at right angles to the section illustrated in Figure 1.

Figure 3 is a section on the line 3—3 of Figure 2, and

Figure 4 is a detail section through one of the valve mechanisms employed in the hydraulic clutch.

Referring more particularly to the drawings, wherein like characters indicate like and corresponding parts throughout the several views, 1 indicates a driving member, which in the present application may be a line shaft or other suitable shaft, while the driven member is indicated by 2. The driven member shown in the drawings, is an ordinary pulley and it is mounted upon the shaft 1 for permitting rotation of the shaft independently of rotation of the pulley, the latter being held against longitudinal displacement upon the shaft by suitable collars 3.

The clutch mechanism, generically indicated by the numeral 5 comprises a pair of bracing members 6 and 7 which are bolted, riveted or otherwise suitably connected to the rim of the pulley 2 as shown at 8 and which have a plurality of transversely extending bracing arms 9 formed thereon. The arms 9 have flanges formed on their inner ends, the inner surfaces of which are concaved for snugly fitting against portions of the outer surface of the cylinders 10 of the clutch mechanism for connecting the cylinders to the bracing structure. These flanged ends of the bracing arms 9 are bolted to the cylinders 10 as shown at 11, and the cylinders are further braced by circumferentially extending bracing arms 12 the flanged ends 13 of which are bolted as shown at 14 to the cylinders 10.

The cylinders 10 are disposed in opposed pairs as clearly shown in Figures 1 and 2 of the drawings, and the cylinders of each pair are connected by pipes or suitable conduits 15 the ends of which enter the outer ends of the cylinders centrally thereof. These pipes or conduits 15 are provided to permit the transmission of the oil or other liquid from one cylinder of each pair to the other cylinder of each pair during the operation of the clutch and valves 16 are interposed in the conduit for controlling the passage of the liquid from one cylinder to the other. These valves may be operated, by any suitable mechanism, such as pinions 17 connected to the valve and which mesh with longitudinally movable racks 18. The racks 18 are guided in their movement by suitable guides 19 and their inner ends are connected by means of slot and pin connections to bell cranks 20 which are pivotally connected as shown at 21 to the bracing members 7. The bell cranks 20 are connected by links 22 to a shiftable collar 23 which is slidably mounted upon the shaft 1 so that by the shifting or sliding of the collar 23 the movement of the valves 16 may be made for regulating displacement of the oil or liquids in the cylinders and consequently regulating the rotation of the rim or pulley 2 by the rotation of the shaft 1 by the medium of the piston which reciprocates in the cylinder and the extension carried by the shaft which reciprocates the said piston.

The pistons which reciprocate in the various cylinders are indicated by the reference characters 24 and these pistons are connected in opposed pairs by suitable yokes 25. The yokes 25 are positioned at one side of the piston as clearly shown in Figure 2 of the drawings and they are provided with oval openings 26 which engage over the shaft 1 to permit the reciprocation of the pistons. The inner ends of the pistons 24 ride upon the periphery of a disc 27 which is eccentrically mounted upon the shaft 1 and will reciprocate the pistons during the rotation of the shaft when the valves 16 are open, allowing the shaft to rotate without imparting rotation to the pulley 2. However, in case the valves 16 are closed, as shown in Figure 4 of the drawings, the displacement of the liquid or oil from one cylinder of each pair to the other will be prevented and consequently the various pistons will be locked in position, causing the rotation of the shaft 1 to be transmitted to the pulley. The speed of rotation of the pulley 2, by the rotation of the shaft 1 may be regulated, by the regulation of the valves 16 for regulating in turn the quantity of the fluid or liquid displaced thereby allowing the pulley 2 to be rotated at a speed corresponding to or varying in speed less than the speed of the rotation of the shaft 1.

For preventing the escape or loss of the operating liquid which might leak past the piston and also to reduce the operating friction to a minimum, I provide a liquid tight housing or envelope for the inner end of the piston, diagrammatically illustrated in the drawings as diaphragms, designated generally by 30. These diaphragms, which are expansible and contractible, are connected at their outer sides to the inner ends of the cylinders 10 by suitable confining rings 31, and at their inner sides to the inner ends of the piston 24 by similar confining rings 33. Each diaphragm, as shown, consists of a pair of corrugated diaphragm disks 32 connected together at their outer peripheries. These diaphragms thus constructed and connected provide frictionless envelopes or casings connecting and covering the inner ends of the respective cylinders and pistons, expanding and contracting with the outward and inward movement of the piston and preventing the escape or loss of any of the operating liquid which leaks past the piston. The pistons 24 are provided with longitudinally extending centrally disposed ways or ducts 34 which have communication, through the outer ends of the pistons with the interior of the cylinders 10. These ducts or ways 34 communicate with transverse ways 35 formed in the piston and having communication with the interior of the diaphragm structures 30 allowing the limited quantity of the oil to flow through the ducts 34 and 35 into the diaphragm structures upon the movement of the pistons out of the cylinders and when the pistons move into the cylinders and the diaphragms are collapsed the oil will be forced out of the duct into the cylinder. As the cylinders are filled at all times with the operating liquid, which is preferably oil, they are at all times thoroughly lubricated and furthermore the projecting ends of the pistons are lubricated by the oil within the diaphragm. Any oil which may leak past the pistons will be caught and retained by the diaphragm and upon the movement of the piston into the cylinder such leakage will be returned to the cylinder with the main body of oil through the communicating passages which are provided in the piston. In this way I provide a practically closed hydraulic or liquid pressure system which once filled does not require replenishing.

By connecting the pistons in opposed pairs, it will be noted that when one piston is moved or forced into its cylinder, the other piston will be drawn out of the cylinder and the piston entering into the cylinder will force the oil or liquid therefrom through the pipe or conduit 15 into the cylinder through which the piston is received, provided the valves 16 are open. However, if the valves 16 are closed, the liquid or oil will be locked against displacement and consequently the pistons will be locked against movement and the rotation of the shaft 1 will be transmitted to the pulley 2. By means of the valve 16 I can readily adjust the rate of flow of oil from one cylinder to the opposite cylinder and thereby control the speed of rotation of the pulley relative to the rotation of the shaft as desired.

It is obvious that many modifications of my invention and changes in structure will readily suggest themselves to one skilled in the art and I do not limit my invention to the specific construction herein shown and described, such being merely a typical embodiment of my invention.

I claim:

1. In a hydraulic clutch, the combination, of a plurality of cylinders arranged in opposed pairs, pistons for reciprocation in said cylinders, said pistons connected for synchronous movement, and expansible and collapsible diaphragms having their outer ends connected to said cylinders and their inner ends connected to said pistons for expansion upon movement of the pistons out of said cylinders and contraction upon movement of the pistons into the cylinders.

2. In a hydraulic clutch, the combination, of a plurality of cylinders arranged in opposed pairs, pistons for reciprocation in said cylinders, said pistons connected for synchronous movement, and expansible and collapsible diaphragms having their outer ends connected to said cylinders and their inner ends connected to said pistons for expansion upon movement of the pistons out of said cylinders and contraction upon movement of the pistons into the cylinders, said pistons provided with passages extending therethrough and communicating with their outer ends and with the interior of said diaphragms.

3. In a hydraulic clutch, the combination, of a plurality of cylinders arranged in opposed pairs, pistons for reciprocation in said cylinders, said pistons connected for synchronous movement, expansible and collapsible diaphragms having their outer ends connected to said cylinders and their inner ends connected to said pistons for expansion upon movement of the pistons out of said cylinders and contraction upon movement of the pistons into the cylinders, said pistons provided with passages extending therethrough and communicating with their outer ends and with the interior of said diaphragms, a pipe connecting opposed cylinders of each pair to permit the passage of liquid from one cylinder to the other, and a valve interposed in said pipe for controlling the quantity of liquid passing through the pipe.

4. In a hydraulic clutch, the combination, of a plurality of cylinders arranged in opposed pairs, pistons for reciprocation in said cylinders, said pistons connected for synchronous movement and expansible and collapsible diaphragms having their outer ends connected to said cylinders and their inner ends connected to said pistons for expansion upon movement of the pistons out of said cylinders and contraction upon movement of the pistons into the cylinders, said pistons provided with passages extending therethrough and communicating with their outer ends and with the interior of said diaphragms, a pipe connecting opposed cylinders of each pair to permit the passage of liquid from one cylinder to the other, and a valve interposed in each said pipe for controlling the quantity of liquid passing through the pipe, said passages in said pistons permitting oil to be forced out of the diaphragms as the pistons move into the cylinders.

5. In a hydraulic clutch, the combination, of a shaft, a pulley, a plurality of cylinders connected to said pulley and arranged in opposed pairs, a piston for reciprocatory movement in each said cylinder, said pistons connected in pairs by yokes, said yokes provided with elongated slots for receiving said shaft, an eccentric disc carried by said shaft and adapted for engagement with the inner ends of said pistons to reciprocate the pistons within the cylinders, pipes connecting the outer ends of opposed cylinders of each pair, and valves interposed in said pipes for controlling the passage of fluid from one cylinder to another, diaphragms having their outer ends connected to said cylinders and their inner ends to said pistons for expansion upon movement of the pistons out of the cylinders and collapsing upon movement of the pistons into the cylinders, said diaphragm positioned for receiving the liquid therein which might escape about said piston, to prevent leakage of the liquid.

6. In a hydraulic clutch, a plurality of opposed cylinders arranged in pairs, pistons for reciprocation in the cylinders, the pistons connected for movement, and expansible and collapsible envelopes connecting the inner ends of the cylinders to the inner ends of respective pistons to prevent leakage of the operating liquid.

7. In a hydraulic clutch, a plurality of opposed cylinders arranged in pairs, pistons for reciprocation in the cylinders, the opposed pistons of each pair connected together for simultaneous movement, yielding envelopes covering the inner ends of the pistons and connecting said inner ends with the inner ends of the cylinders for preventing the escape of any operating liquid which leaks past the piston, the piston having a passage connecting the pressure space within the cylinder with the interior of its envelope.

8. In a hydraulic clutch, a rotatable shaft, a pulley concentric with the shaft, a plurality of radially opposed cylinders within said pulley and arranged around the shaft, pistons in the cylinders, yokes connecting opposed pistons, the yokes guided on said shaft, an eccentric on the shaft for reciprocating the pistons, diaphragms connecting the inner ends of the cylinders with the inner ends of their respective pistons, conduits connecting the outer ends of opposed cylinders, valves for controlling said conduits, and means for adjusting said valves while the shaft is rotating for controlling the rotation of the pulley.

WILSON W. SIDES.